United States Patent
Radosavljevic et al.

(10) Patent No.: US 6,437,242 B1
(45) Date of Patent: Aug. 20, 2002

(54) OPENING MECHANISM FOR ELECTRICAL OUTLET BOX

(75) Inventors: Dejan Radosavljevic, LaFayette; Gerald R. Savicki, Syracuse, both of NY (US)

(73) Assignee: Pass & Seymour, Inc, Syracuse, NY (US)

( * ) Notice: Subject to any disclaimer, the term of this patent is extended or adjusted under 35 U.S.C. 154(b) by 0 days.

(21) Appl. No.: 09/755,420

(22) Filed: Jan. 5, 2001

(51) Int. Cl.[7] ................................................ H02G 3/14
(52) U.S. Cl. ......................... 174/67; 220/241; 439/139
(58) Field of Search .............................. 174/66, 67, 50, 174/48, 58, 57; 220/241, 242, 4.24, 4.22, 4.23, 3.8; 439/139, 11, 31, 165, 142, 373, 361; 361/641

(56) References Cited

U.S. PATENT DOCUMENTS

| | | |
|---|---|---|
| 2,510,745 A | 6/1950 | Kilgore |
| 2,526,606 A | 10/1950 | Gregg |
| 2,757,817 A | 8/1956 | Egan |
| 2,880,264 A | 3/1959 | Ruskin |
| 2,916,733 A | 12/1959 | Hirsch |
| 3,200,989 A | 8/1965 | Hubbell |
| 3,236,990 A | 2/1966 | Bates |
| 3,252,611 A | 5/1966 | Weitzman et al. |
| 3,701,451 A | 10/1972 | Schindler et al. |
| 3,716,815 A | 2/1973 | Riches |
| 4,109,095 A | 8/1978 | Kling et al. |
| 4,135,337 A | 1/1979 | Medlin |
| 4,197,959 A | 4/1980 | Kramer |
| 4,265,365 A | 5/1981 | Boteler |
| 4,342,493 A | 8/1982 | Grenell |
| 4,381,063 A | 4/1983 | Leong |
| 4,424,407 A | 1/1984 | Barbic |
| 4,500,008 A | 2/1985 | Cook |
| 4,505,403 A | 3/1985 | Bowden, Jr. et al. |
| 4,603,932 A | 8/1986 | Heverly |
| 4,605,817 A | 8/1986 | Lopez |
| 4,733,330 A | 3/1988 | Tanaka et al. |
| 4,803,307 A | 2/1989 | Shotey |
| 4,874,906 A | 10/1989 | Shotey |
| 4,915,638 A | 4/1990 | Domain |
| 4,988,832 A | 1/1991 | Shotey |
| 5,045,640 A | 9/1991 | Riceman |
| 5,218,169 A | * 6/1993 | Riceman ...................... 174/67 |
| 5,243,135 A | * 9/1993 | Shotey ......................... 174/67 |
| 5,245,507 A | * 9/1993 | Ericksen .................... 361/641 |
| 5,280,135 A | 1/1994 | Berlin et al. |
| 5,527,993 A | * 6/1996 | Shotey et al. ................. 174/67 |
| 6,133,531 A | 10/2000 | Hayduke et al. |

FOREIGN PATENT DOCUMENTS

| | | | |
|---|---|---|---|
| CA | 644330 | 7/1962 | |
| DE | 3710306 A1 | 10/1988 | |
| GB | 1580037 | * 11/1980 | .................. 174/67 |

* cited by examiner

Primary Examiner—Dean A. Reichard
Assistant Examiner—Dhiru R Patel
(74) Attorney, Agent, or Firm—Wall Marjama & Bilinski

(57) ABSTRACT

A weather-resistant outlet box is hinged at one corner and includes a cover which latches to a back body at an opposite corner. A flexible latch member, which contains a hook member, is molded as an integral part of the cover. A catch piece on the back body interlocks with the hook member when the cover is closed. The flexible latch member includes a trigger member extending from the hook member. A thumb rest on the cover permits one-handed operation. The cover is opened by placing a user's thumb on the thumb rest while simultaneously pulling the trigger member with the user's finger, thus unlocking the hook member from the catch piece and permitting the cover to open.

9 Claims, 5 Drawing Sheets

OPENING MECHANISM FOR ELECTRICAL OUTLET BOX

FIELD OF THE INVENTION

The invention pertains to the field of weather-resistant electrical outlet boxes, and in particular, to a latch mechanism for a cover of such a box.

BACKGROUND OF THE INVENTION

When electrical outlets are placed outdoors for outdoor lighting, holiday lights, etc., the damaging effects of weather conditions require a weather-resistant outdoor electrical outlet cover. Weather-resistant covers come in two general styles. The first style protects the outlet (receptacle), usually with a hinged flap or lid that stays shut while the outlet is not in use. The second style protects both the outlet and the plug of the power cord. This feature is convenient when an outdoor appliance or light are plugged into an outlet for an extended period. This second style is typically a box shape that houses the outlet receptacle and provides space for the plug. This second style is the subject of the present invention.

Two primary components make up the typical weather-resistant outlet box: the back body and the cover. The back body and the cover are typically hinged to one another on one end, with a latching mechanism on the opposite end to hold the cover closed to the body. Different latching mechanisms are employed for this purpose. There is a need for a latching mechanism that is easy to operate.

SUMMARY OF THE INVENTION

Briefly stated, a weather-resistant outlet box is hinged at one corner and includes a cover which latches to a back body at an opposite corner. A flexible latch member, which contains a hook member, is molded as an integral part of the cover. A catch piece on the back body interlocks with the hook member when the cover is closed. The flexible latch member includes a trigger member extending from the hook member. A thumb rest on the cover permits one-handed operation. The cover is opened by placing a user's thumb on the thumb rest while simultaneously pulling the trigger member with the user's finger, thus unlocking the hook member from the catch piece and permitting the cover to open.

According to an embodiment of the invention, a latch for a weather-resistant outlet box, wherein the outlet box includes a back body and a cover pivotally connected at a first corner, includes a flexible latch member flexibly connected to the cover adjacent a second corner, the second corner being substantially opposite the first corner; the flexible latch member including a hook member and a trigger member extending from the hook member; a thumb rest connected to the cover adjacent the flexible latch member; a catch piece on the back body disposed such that when the cover is closed onto the back body, the hook member engages the catch piece so that the cover is latched closed; and the trigger member and the thumb rest being aligned such that when a thumb of a user rests on the thumb rest, an index finger of the user is curlingly positioned to engage the trigger member, such that when force is applied by the user to the index finger against the trigger member, the hook member is disengaged from the catch piece, thereby permitting the cover to be opened.

DETAILED DESCRIPTION OF THE PREFERRED EMBODIMENT

Figure 1:
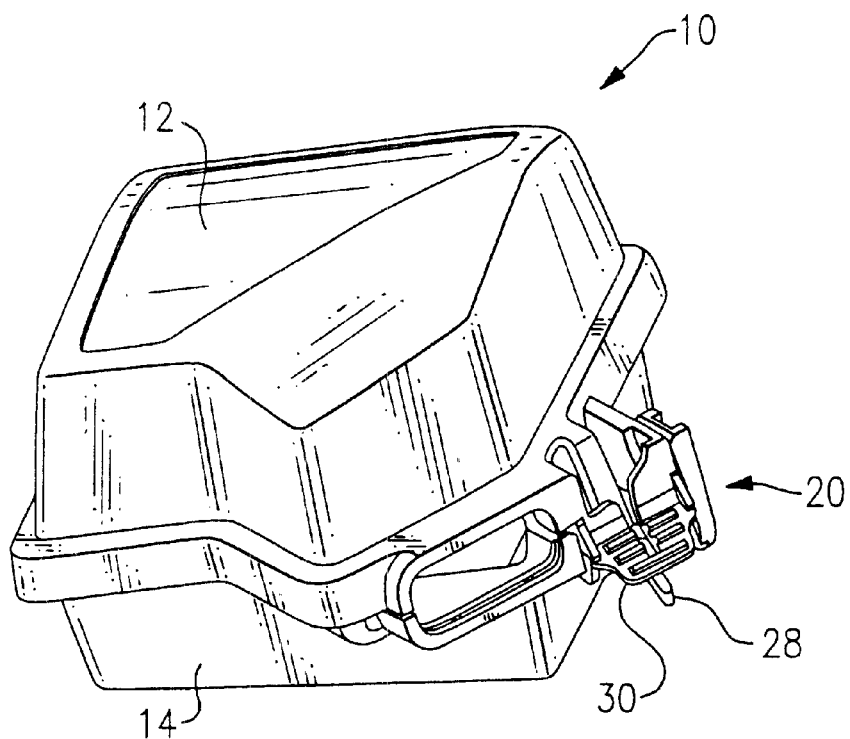
FIG. 1 shows a perspective view of a weather-resistant electrical box having a cover and a back body latched together by a latching mechanism according to an embodiment of the invention.
Figure 2:
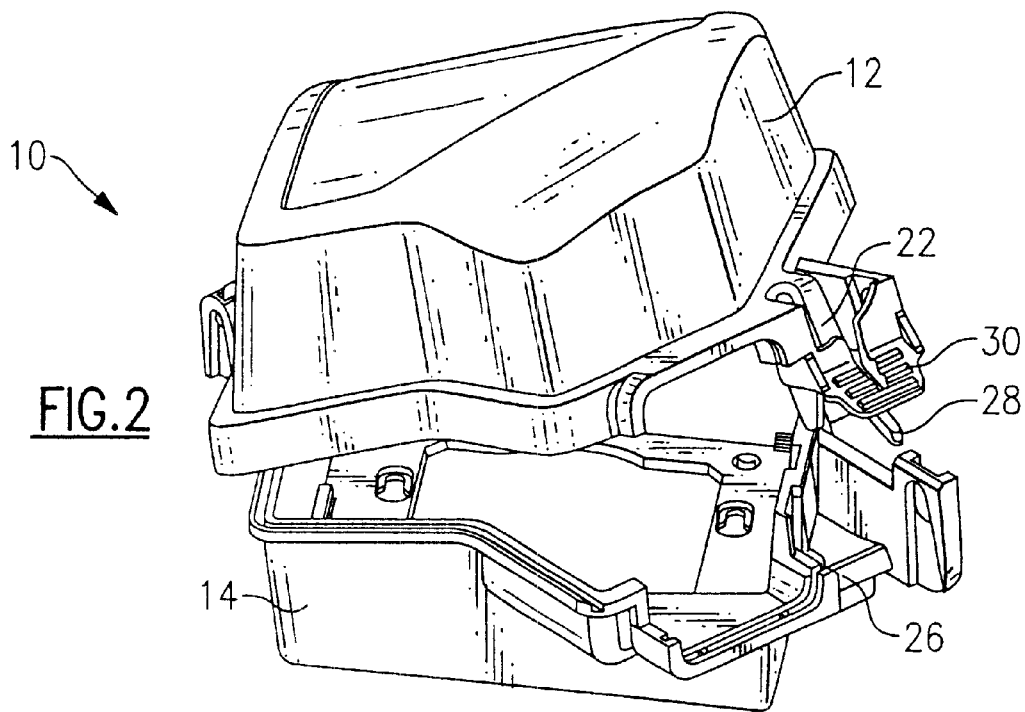
FIG. 2 shows a perspective view of the cover of the weather-resistant electrical box in a slightly opened position.

Referring to FIGS. 1–2, a weather-resistant electrical outlet box 10 includes a cover 12 and a back body 14. Outlet box 10 is described in detail in U.S. Pat. No. 6,133,531 which issued Oct. 17, 2000 and is entitled WEATHERPROOF OUTLET COVER, incorporated herein by reference. Cover 12 is typically hinged to back body 14 at one corner, with a latching mechanism 20 at the opposite corner. A flexible latch member 22 of latching mechanism 20 is preferably molded as an integral part of cover 12. Outlet box 10 is preferably of plastic for manufacturing purposes, but metal would work equally well.

Figure 3:
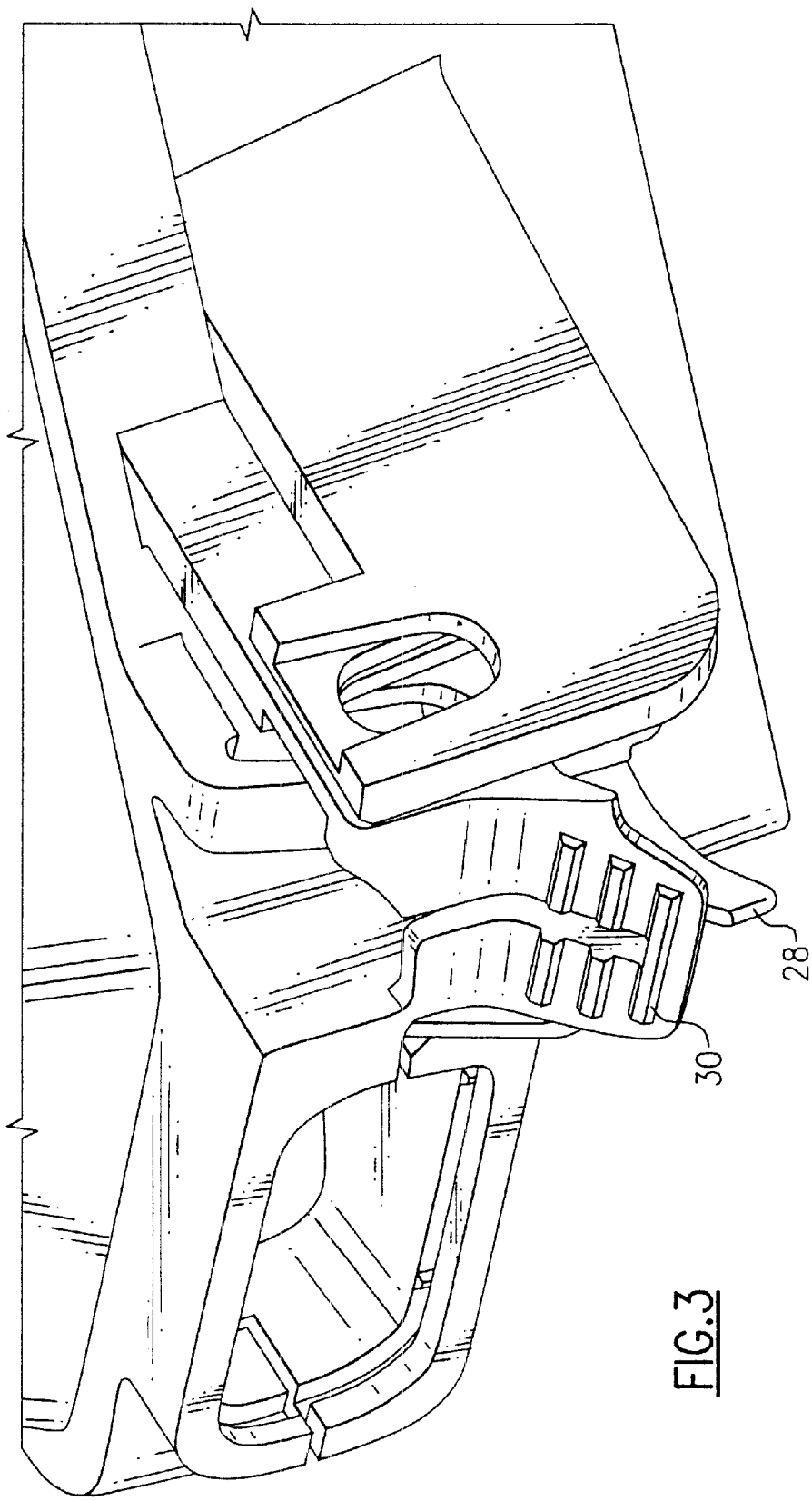
FIG. 3 shows a perspective view of a flexible latch member of the latching mechanism of the present invention.
Figure 4:
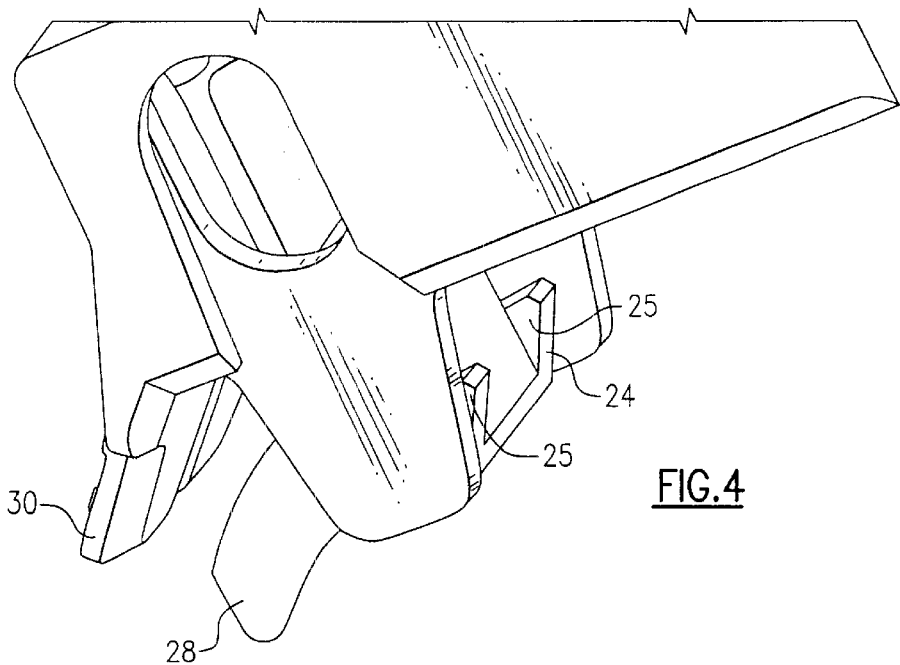
FIG. 4 shows another view of the flexible latch member of the latching mechanism of the present invention.

Referring also to FIGS. 3–4, flexible latch member 22 contains a trigger member 28 and a hook member 24. Hook member 24, preferably including two hooks 25, is connected to trigger member 28 so that applying force to trigger member 28 causes hook member 24 to move. A thumb rest 30, also part of latching mechanism 20, is connected to cover 12. Thumb rest 30 and flexible latch member 22 are preferably attached to cover 12 by one-piece molding techniques.

Figure 5:
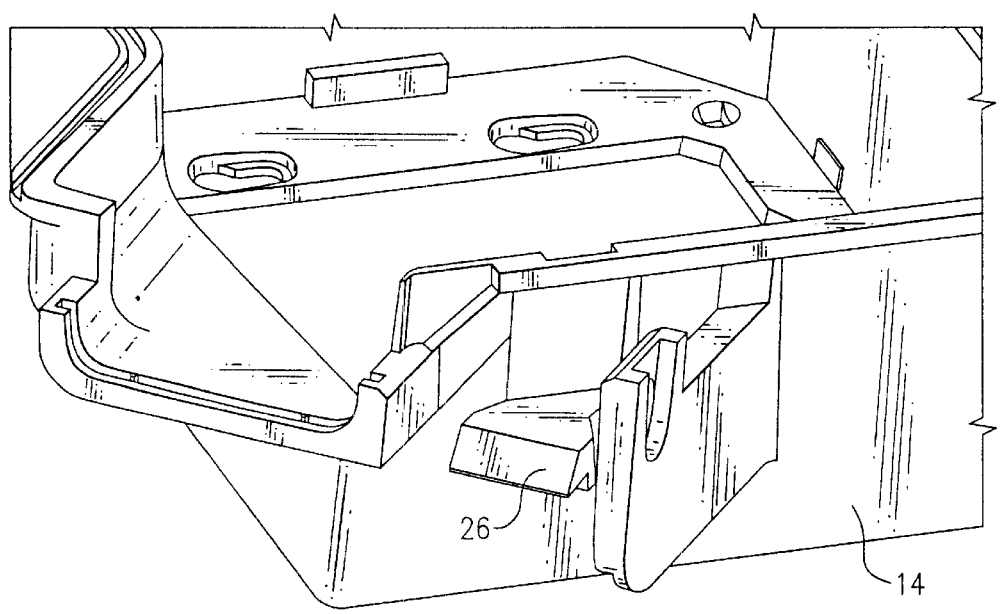
FIG. 5 shows a perspective view of a catch piece on the back body of the weather-resistant electrical box.
Figure 6:
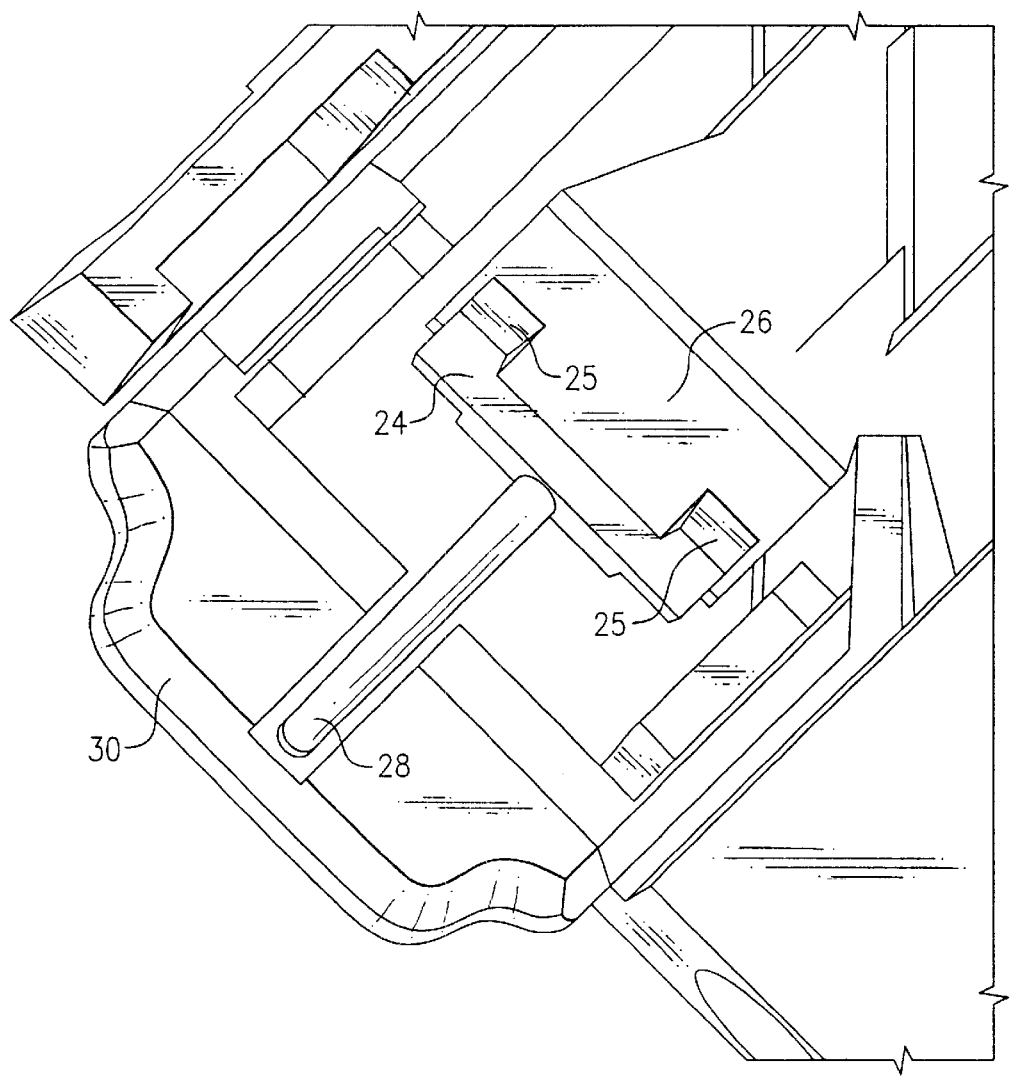
FIG. 6 shows a bottom view of the flexible latch member interlocked with the catch piece.

Referring to FIGS. 5–6, a catch piece 26 is attached to back body 14, preferably by one-piece molding techniques. As seen in FIG. 6, hook member 24 interlocks with catch piece 26 when cover 12 is fully closed onto back body 14. The angle between an underside of catch piece 26, that is, the side that latches with hook member 24, and a side of cover 12 is less than 90 degrees, and preferably about 80 degrees.

Figure 7:
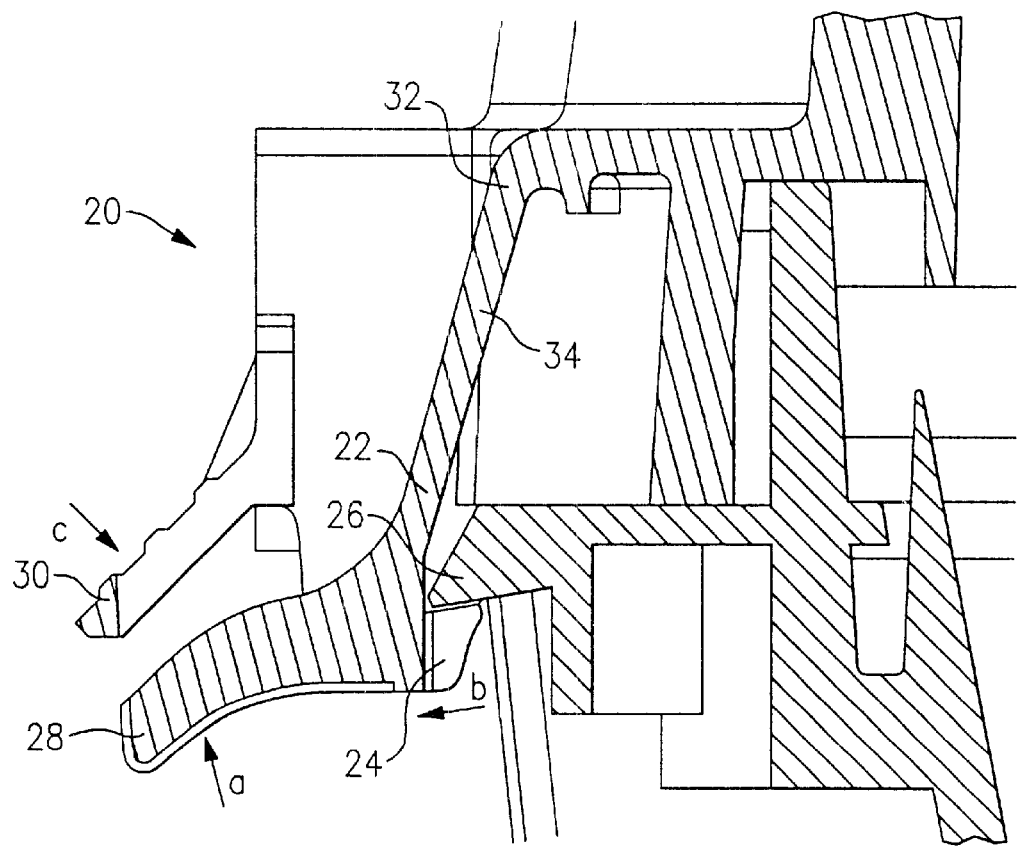
FIG. 7 shows a cross-sectional view of the latching mechanism according to an embodiment of the present invention.

Referring to FIG. 7, flexible latch member 22 is connected to a pivotal area 32 by an arm 34. Applying force to trigger member 28 in a direction indicated by an arrow "a" thus moves hook member 24 in a direction indicated by an arrow "b", causing hook member 24 to unlatch from catch piece 26. An arrow "c" indicates the force applied by a user's thumb in the opening operation. The cover 12 is preferably opened by placing the user's thumb on thumb rest 30 while simultaneously pulling trigger member 28 with the user's finger, thus unlocking hook member 24 from catch piece 26 and permitting cover 12 to open. The benefit of this design is that cover 12 is easily opened with a one-hand operation.

The slot in thumb rest 30 and the width of trigger member 28 are a design choice dictated by making thumb rest 30 and flexible latch member 22 molded in one-piece with cover 12, which is the preferred embodiment. The precise shapes and dimensions of these features could change with different manufacturing techniques.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A latch for a weather-resistant outlet box, wherein said outlet box includes a back body and a cover pivotally connected at a first corner, comprising:

a flexible latch member flexibly connected to said cover adjacent a second corner, said second corner being substantially opposite said first corner;

said flexible latch member including a hook member and a trigger member extending from said hook member;

a thumb rest connected to said cover adjacent said flexible latch member;

a catch piece on said back body disposed such that when said cover is closed onto said back body, said hook member engages said catch piece so that said cover is latched closed; and said trigger member and said thumb rest being aligned such that when a thumb of a user rests on said thumb rest, an index finger of said user is curlingly positioned to engage said trigger member, such that when force is applied by said user to said index finger against said trigger member, said hook member is disengaged from said catch piece, thereby permitting said cover to be opened.

2. A latch according to claim 1, wherein said flexible latch member further includes an arm connecting said flexible latch member to said cover.

3. A latch according to claim 1, wherein an underside of said catch piece makes an angle of less than 90 degrees with a side wall of said back body.

4. A latch according to claim 1, wherein said flexible latch member and said thumb rest are one-piece with said cover.

5. A latch according to claim 4, wherein said catch piece is one piece with said back body.

6. A latch according to claim 5, wherein said cover and said back body are of molded plastic.

7. A latch according to claim 1, wherein said flexible latch member further includes an arm connecting said flexible latch member to said cover and wherein an underside of said catch piece makes an angle of less than 90 degrees with a side wall of said back body.

8. A latch according to claim 1, wherein an underside of said catch piece makes an angle of less than 90 degrees with a side wall of said back body; wherein said flexible latch member and said thumb rest are one-piece with said cover; and wherein said catch piece is one piece with said back body.

9. A latch according to claim 1, wherein said flexible latch member further includes an arm connecting said flexible latch member to said cover and wherein said flexible latch member and said thumb rest are one-piece with said cover.

* * * * *